W. W. NEIGHBOUR.
SHAFT BEARING.
APPLICATION FILED MAY 16, 1919.

1,339,277.  Patented May 4, 1920.

Inventor
W. W. Neighbour
By Victor J. Evans
Attorney.

UNITED STATES PATENT OFFICE.

WILLIAM W. NEIGHBOUR, OF SPARTANBURG, SOUTH CAROLINA.

SHAFT-BEARING.

1,339,277.  Specification of Letters Patent.  Patented May 4, 1920.

Application filed May 16, 1919. Serial No. 297,593.

*To all whom it may concern:*

Be it known that I, WILLIAM W. NEIGHBOUR, a citizen of the United States, residing at Spartanburg, in the county of Spartanburg and State of South Carolina, have invented new and useful Improvements in Shaft-Bearings, of which the following is a specification.

This invention relates to a shaft bearing primarily intended for use in connection with the loom shaft upon which the rocker arm and picker arm operates, although its general application is contemplated by the claims.

The invention contemplates a provision of a noiseless, oilless and dust proof anti-friction bearing made up of a number of parts designed for association in a manner to permit of a slight adjustment with relation to the shaft to compensate for wear.

The nature and advantages of the invention will be better understood when the following detailed description is taken in connection with the accompanying drawing, the invention residing in the construction, combination and arrangement of parts as claimed.

In the drawings forming part of this specification like numerals of reference indicate similar parts in the several views, and wherein.

Figure 1:
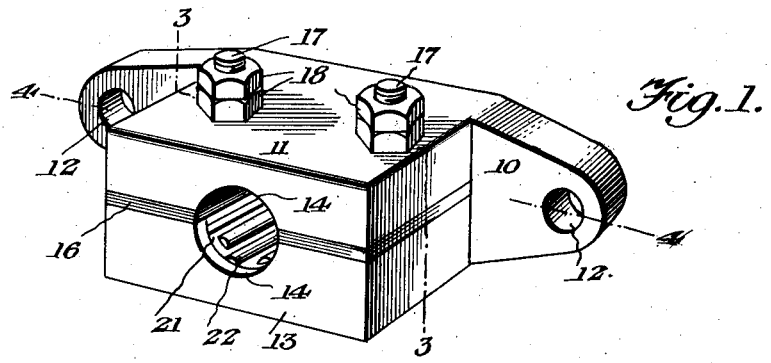
Figure 1 is a perspective view of the bearing.
Figure 2:
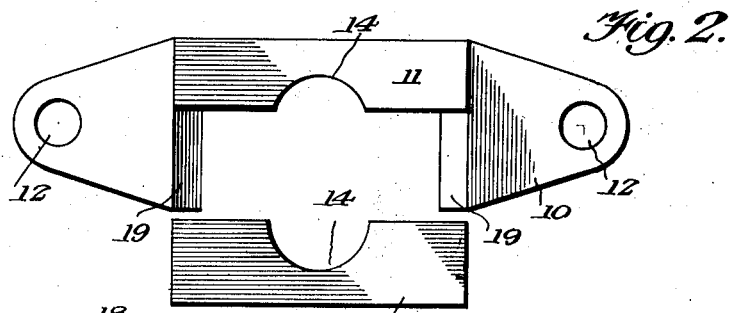
Fig. 2 is a view of the sections thereof separated.
Figure 3:
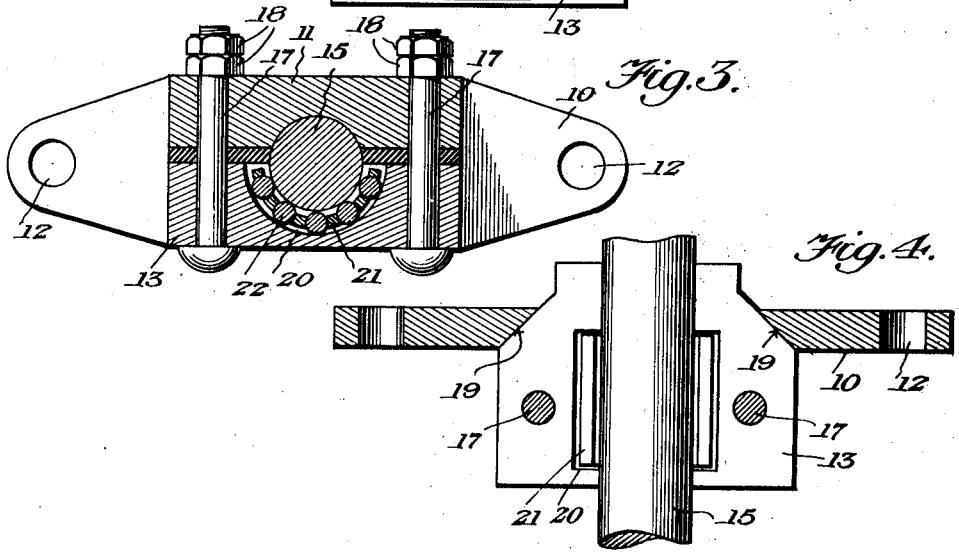
Fig. 3 is a vertical section taken on line 3—3 of Fig. 1.
Figure 4:
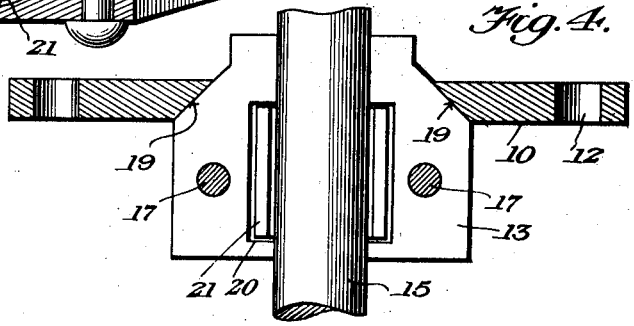
Fig. 4 is a horizontal section taken on line 4—4 of Fig. 1.

Referring more to the drawing in detail, the device forming the subject matter of my invention embodies an upper and lower section, the upper section including an elongated plate 10 from one side of which projects a horizontally disposed bearing member 11. The plate 10 projects an appreciable distance beyond the opposite ends of the bearing member 11, this plate being provided to secure the bearing as an entirety to the loom frame or other support, and for this purpose the plate is provided with openings 12 for the reception of suitable fastening elements. The lower section includes a bearing member 13 of a size and configuration similar to the bearing member 11. The confronting faces of the bearing members 11 and 13 respectively are cut away as at 14 for the reception of the shaft 15. Interposed between the confronting faces of the respective bearing members is a packing 16 of any suitable compressible material, and passed through said bearing members and the packing 16 are bolts 17 for holding said parts operatively associated. The packing 16 provides for a slight adjustment between the bearing members 11 and 13 respectively to compensate for wear, and this adjustment may be made by tightening the nuts 18 upon the bolts 17 as will be readily understood. It will be noted that the width of the packing plate 10 is equal to the combined thickness of the bearing members 11 and 13 plus the thickness of the packing 16, so that the bearing member 13 lies substantially flush with the lower edge of the plate 10. The plate 10 at a point below the bearing member 11 is beveled as at 19 to correspond with the bevel of the adjacent edge of the bearing member 13, a construction which may assist in maintaining the lower bearing member 13 in position upon the plate 10. The cut away portion 14 of the bearing member 13 is recessed as at 20 for the reception of a staggered retainer 21 for the anti-frictional elements 22 which may be either rollers or balls. It is to be observed, that when the bearing members 11 and 13 respectively are associated, the recess 20 terminates beneath the member 11 at opposite sides of the cut away portion 14 thereof; and in this manner the retainer 21 is maintained in its proper position with respect to the shaft 15.

While I have shown and described what I consider the preferred embodiment of the invention, I desire to have it understood that what is herein shown and described is merely illustrative, that I do not limit myself to this construction, and that such changes may be resorted to when desired as fall within the scope of what is claimed.

What I claim is:—

1. A device of the character described comprising an elongated plate, a bearing member projecting from one side of the plate medially thereof, a second bearing member in parallelism with the first mentioned member and engaged against said plate, compressible packing material interposed between said members, means connecting said parts together, and said plate and second mentioned bearing member having their adjacent surfaces correspondingly beveled, whereby to assist in supporting the second mentioned bearing member upon the plate.

2. A device of the character described comprising an elongated plate, a bearing member projecting from one side of the plate above the longitudinal center thereof, a second bearing member disposed against the plate below the longitudinal center thereof, a retainer for anti-frictional elements, said second mentioned member being recessed for the reception of said retainer, compressible packing material interposed between said members, and means connecting said parts together whereby said second member may be slightly adjusted relatively to the first mentioned member.

In testimony whereof I affix my signature.

WILLIAM W. NEIGHBOUR.